No. 730,504. PATENTED JUNE 9, 1903.
O. A. WOLTERS.
KEYBOARD OPERATOR.
APPLICATION FILED FEB. 4, 1903.
NO MODEL. 2 SHEETS—SHEET 1.

WITNESSES
W. A. Alexander
L. B. Beach

INVENTOR
Otto Adolf Wolters
By Fowler & Bryson
ATTORNEYS

No. 730,504. PATENTED JUNE 9, 1903.
O. A. WOLTERS.
KEYBOARD OPERATOR.
APPLICATION FILED FEB. 4, 1903.
NO MODEL. 2 SHEETS—SHEET 2.
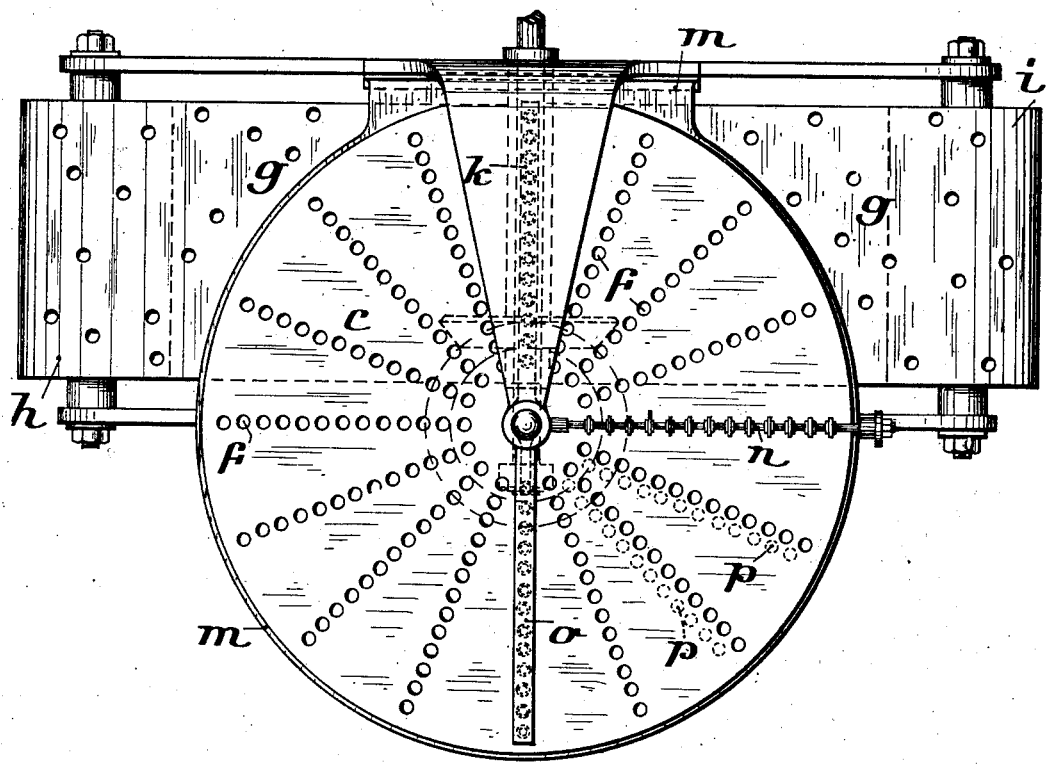
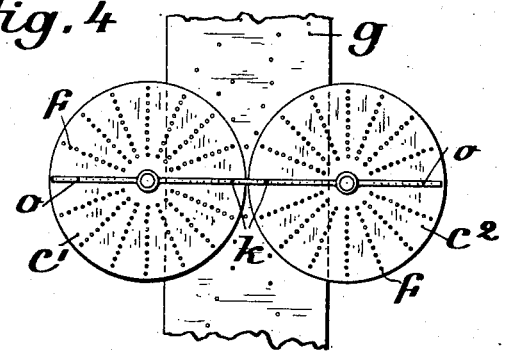
WITNESSES
W. H. Alexander
L. B. Beach,
INVENTOR
Otto Adolf Wolters
By Fowler & Bryson
ATTORNEYS No. 730,504. Patented June 9, 1903.

UNITED STATES PATENT OFFICE.

OTTO ADOLF WOLTERS, OF HANOVER, GERMANY.

KEYBOARD-OPERATOR.

SPECIFICATION forming part of Letters Patent No. 730,504, dated June 9, 1903.

Application filed February 4, 1903. Serial No. 141,912. (No model.)

*To all whom it may concern:*

Be it known that I, OTTO ADOLF WOLTERS, merchant, a subject of the Emperor of Germany, residing at Lemförderstrasse 5, Hanover, Germany, have invented a certain new and useful Keyboard-Operator; and I do hereby declare the following to be a full, clear, and exact description of the invention, such as will enable others skilled in the art to which it appertains to make and use the same.

My invention relates to a driving mechanism for operating machines or instruments of all kinds that are set in motion by keyboards, key-levers, or the like by means of a perforated record-strip. The principal part of the mechanism consists of two disks or two pairs of disks placed concentrically one above the other. One of these disks or pair of disks serves as a magazine containing pins in corresponding borings, which being lifted through the holes in the record-strip by a magnetized comb are received in perforations in the second disk registering with the borings of the first disk and carried past a set of levers, one of which is moved by the pin projecting out of the disk, and thus transmits its motion on to the keyboard. After having passed the levers the pins raised by the magnetized comb are pressed down again into the magazine-disk by a second comb.

Figure 1:
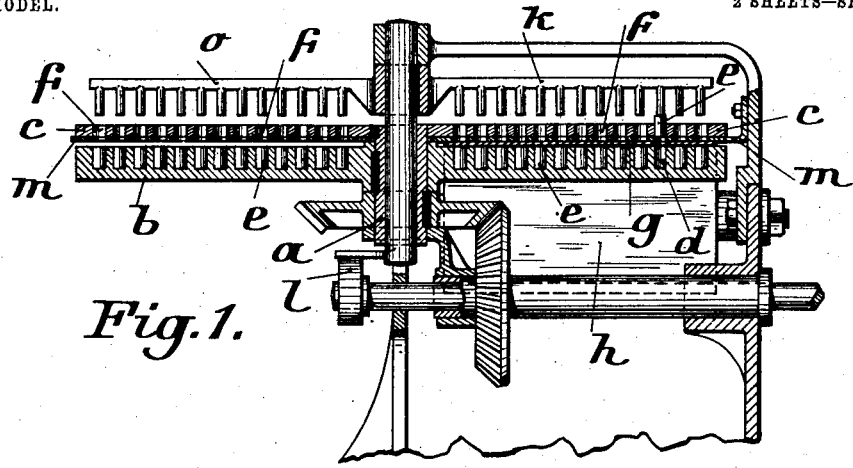
Figure 2:
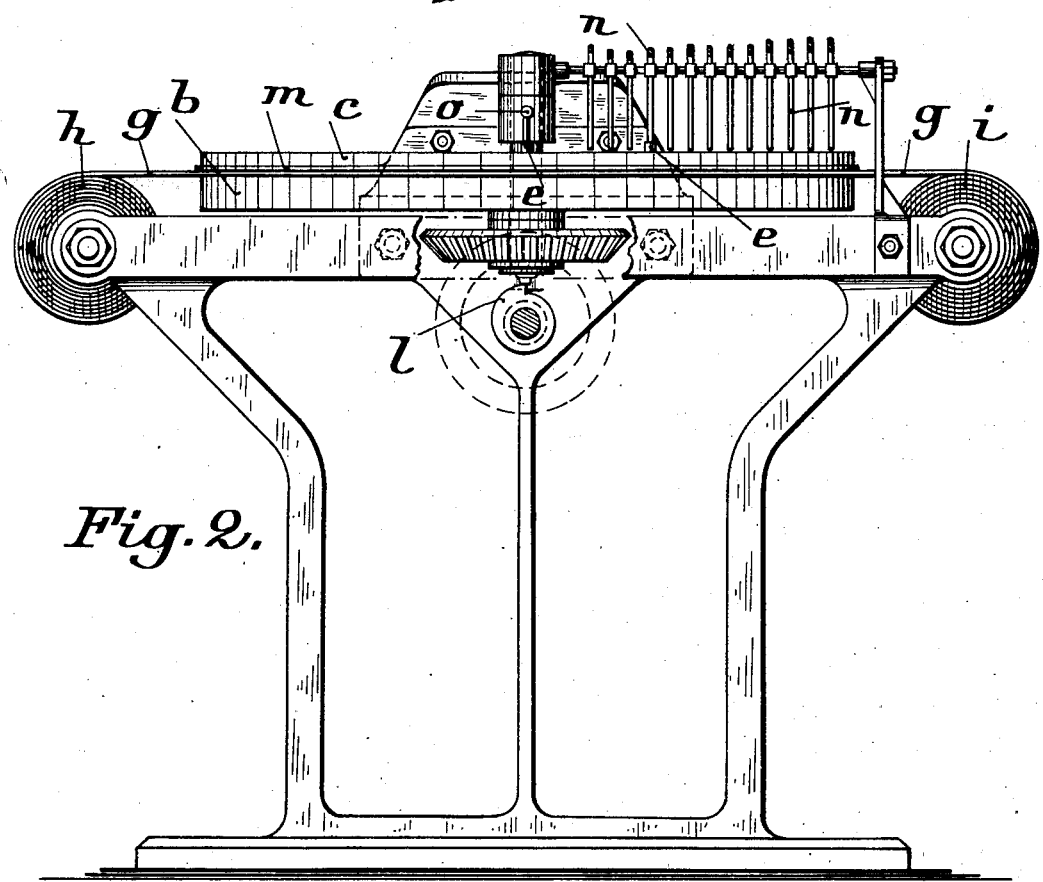

Referring to the accompanying drawings, Figure 1 is a vertical section, Fig. 2 is a side elevation, and Fig. 3 is a plan view, of an apparatus constructed according to the present invention. Fig. 4 is a diagrammatical plan view of a modification, showing a pair of disks.

Referring to Figs. 1 to 3, on a shaft $a$ are fixed two disks $b$ and $c$, which revolve in the same direction and with the same velocity at a small distance one over the other. In the lower and thicker disk $b$ borings $d$ are provided, containing pins $e$, Fig. 1, the borings $d$ being arranged radially, as shown in Fig. 3. The upper and thinner disk $c$ contains rows of holes exactly registering with the borings in the lower disk. As shown at $p$ in Fig. 3 by dotted lines, the borings $d$ and holes of each row may be alternately displaced, whereby a greater number of holes can be provided in each row. The holes, borings, and pins may have a round cross-section, as shown, or a cross-section of any other shape—say a rectangular one.

The perforated record-strip $g$, made in a well-known manner by means of a perforating-machine, moves between the two disks on one side of the shaft $a$ from the spool $h$ to the spool $i$, its speed being so adjusted that the perforations placed on the same transverse line on the record-strip register exactly with a row of borings and holes in the disks $b$ and $c$ at the time when such row arrives under the comb $k$, being the position shown in Figs. 1 and 2. This comb is moved up and down by a cam $l$ and moves upward at the moment when a row of perforations arrives under it, and as a perforation in the record-strip registers at the same time with the borings and perforations $d$ and $f$ in the disks, Fig. 1, the comb $k$, being magnetized for the purpose, raises the steel pin $e$, which registers with a perforation in the record-strip altogether out of the boring of the lower disk $b$, so that it is carried on by the disk $c$. For the purpose of preventing the pin from falling back prematurely into the corresponding boring of the disk $b$ a disk $m$, of brass, is provided between the disks $b$ and $c$, which is provided with a row of holes only in the section plane shown in Fig. 1. The pin accordingly rests on the stationary disk $m$ and is carried on by the disk $c$ past the set of levers $n$ and sets the lever corresponding to it in motion. This motion is transmitted in any known manner to the keyboard of the instrument or machine to be operated by the present mechanism.

The raised pins are pressed down again out of the disk $c$ into the disk $b$ by a comb $o$, which moves up and down simultaneously with the comb $k$, but is not magnetized. The disk $m$ being provided with a second row of holes under this comb, as soon as the perforations $d$ and $f$ in the discs register with the row of holes in the stationary disk $m$ the comb $o$ moves downward and forces the raised pins down into the corresponding borings $d$. The motion described is continually repeated as often as the disks $b$ and $c$ advance a row of perforations under the comb $k$.

As shown by Fig. 4, instead of a disk $b$ and a disk $c$ two pairs of disks may be arranged opposite each other, in Fig 4 only the upper pair of disks $c'$ $c^2$ being visible. Then the record-strip $g$ moves between the shafts $a'$ $a^2$ of the pairs and the disks $b'$ $c'$ at the left hand work on the one half of the strip and the disks $b^2$ $c^2$ at the right hand on the other half. Thus the disks can be made of half the diameter of the disks shown in Figs. 1 to 3 and can be moved more quickly, and therefore provided with a less number of radial rows of holes.

The described driving mechanism is applicable to a great many different uses, and especially to operating type setting and forming machines, and it can also be used for operating musical clocks worked by means of of a perforated record-strip.

Having now particularly described and ascertained the nature of my said invention and the manner in which it is to be performed, I declare that what I claim is—

1. In a mechanism for operating machines or instruments by means of a perforated record-strip, the combination with a movable member, of pins carried by said member, a second movable member arranged adjacent to said first-named member so as to allow the passage of a record-strip between said members, perforations in said second member corresponding to the pins in said first-named member, means for moving said pins through the perforations of the record-strip into the perforations of said second movable member, and operating connections actuated by said pins.

2. In a mechanism for operating machines or instruments by means of a perforated record-strip, the combination with a movable member, of pins carried by said member, a second movable member arranged adjacent to said first-named member so as to allow the passage of a record-strip between said members, perforations in said second member corresponding to the pins in said first-named member, magnetic means for moving said pins through the perforations of the record-strip into the perforations of said second movable member, and operating connections actuated by said pins.

3. In a mechanism for operating machines or instruments by means of a perforated record-strip, the combination with a rotary member, of pins carried by said member, a second rotary member arranged adjacent to said first-named member so as to allow the passage of a record-strip between said members, perforations in said second member corresponding to the pins in said first-named member, means for moving said pins through the perforations of the record-strip into the perforations of said second rotary member, and operating connections actuated by said pins.

4. In a mechanism for operating machines or instruments by means of a perforated record-strip, the combination with a rotary member, of pins carried by said member, a second rotary member arranged adjacent to said first-named member so as to allow the passage of a record-strip between said members, perforations in said second member corresponding to the pins in said first-named member, magnetic means for moving said pins through the perforations of the record-strip into the perforations of said second rotary member, and operating connections actuated by said pins.

5. In a mechanism for operating machines or instruments by means of a perforated record-strip, the combination with a movable member, of pins carried by said member, a second movable member arranged adjacent to said first-named member so as to allow the passage of a record-strip between said members, perforations in said second member corresponding to the pins in said first-named member, means for moving said pins through the perforations of the record-strip into the perforations of said second movable member, a supporting member arranged between said movable members for supporting the pins after they have been moved into the perforations of said second movable member, and operating connections actuated by said pins.

6. In a mechanism for operating machines or instruments by means of a perforated record-strip, the combination with a rotary member, of pins carried by said member, a second rotary member arranged adjacent to said first-named member so as to allow the passage of a record-strip between said members, perforations in said second member corresponding to the pins in said first-named member, means for moving said pins through the perforations of the record-strip into the perforations of said second rotary member, a supporting member arranged between said rotary members for supporting the pins after they have been moved into the perforations of said second rotary member, and operating connections actuated by said pins.

7. In a mechanism for operating machines or instruments by means of a perforated record-strip, the combination with a movable member, of pins carried by said movable member, a second movable member arranged adjacent to said first-named member so as to allow the passage of a record-strip between said members, perforations in said second member corresponding to the pins in said first-named member, means for moving said pins through the perforations of the record-strip into the perforations of said second movable member, a supporting member arranged between said movable members for supporting the pins after they have been moved into the perforations of said second movable member, operating connections actuated by said pins, and means for returning said pins to said first-named movable member after they have operated said connection.

8. In a mechanism for operating machines or instruments by means of a perforated record-strip, the combination with a rotary member, of pins carried by said member, a second rotary member arranged adjacent to said first-named member so as to allow the passage of a record-strip between said members, perforations in said second member corresponding to the pins in said first-named member, magnetic means for moving said pins through the perforations of the record-strip into the perforations of said rotary member, a supporting member arranged between said rotary members for supporting the pins after they have moved into the perforations of said second rotary member, operating connections actuated by said pins, and means for returning said pins to said first-named rotary member after they have operated said connections.

9. In a mechanism for operating machines or instruments by way of a perforated record-strip the combination of two disks arranged one above the other, means for rotating both disks in the same direction and with the same velocity, borings arranged in one of the said disks and provided with pins, holes arranged in the other disk and corresponding with the said borings, a magnetic comb and means for moving a record-strip between the said disks, substantially as described and for the purpose set forth.

10. In a mechanism for operating machines or instruments by way of a perforated record-strip the combination of two disks arranged one above the other, means for rotating both disks in the same direction and with the same velocity, borings arranged in one of the said disks and provided with pins, holes arranged in the other disk and corresponding with the said borings, a magnetic comb, an unmagnetic comb, a set of levers between the two combs and means for moving a record-strip between the said disks, substantially as described and for the purpose set forth.

11. In a mechanism for operating machines or instruments by way of a perforated record-strip the combination of two pairs of disks arranged one above the other, means for rotating both pairs of disks in the same direction and with the same velocity, borings arranged in one of the said pairs of disks and provided with pins, holes arranged in the other pair and corresponding with the said borings, a magnetic comb and means for moving a record-strip between the said pairs of disks, substantially as described and for the purpose set forth.

In testimony whereof I have hereunto set my hand in the presence of the two subscribing witnesses.

OTTO ADOLF WOLTERS. [L. S.]

Witnesses:
    LEONORE RASCH,
    C. C. STEVENSON.